United States Patent

Köhler et al.

Patent Number: 5,849,845
Date of Patent: *Dec. 15, 1998

[54] BLENDS OF AROMATIC POLYCARBONATES AND EPOXY-FUNCTIONAL TERPOLYMERS

[75] Inventors: Burkhard Köhler, Leverkusen; Peter Bier, Krefeld, both of Germany

[73] Assignee: Bayer Aktiengesellschaft, Leverkusen, Germany

[*] Notice: The term of this patent shall not extend beyond the expiration date of Pat. No. 5,583,174.

[21] Appl. No.: 585,356

[22] Filed: Jan. 11, 1996

[30] Foreign Application Priority Data

Jan. 19, 1995 [DE] Germany ............ 195 01 501.0

[51] Int. Cl.⁶ .......... C08F 8/00; C08F 283/02; C08L 31/00
[52] U.S. Cl. .......... 525/148; 525/147; 525/463; 525/468
[58] Field of Search .................. 525/148, 147, 525/463, 468

[56] References Cited

U.S. PATENT DOCUMENTS

| | | | |
|---|---|---|---|
| 5,104,723 | 4/1992 | Freitag | 428/220 |
| 5,124,377 | 6/1992 | Price | 524/94 |
| 5,128,404 | 7/1992 | Howe | 525/176 |
| 5,296,550 | 3/1994 | Natarajan et al. | 525/170 |
| 5,342,887 | 8/1994 | Bergstrom et al. | 525/194 |
| 5,369,154 | 11/1994 | Laughner | 525/148 |
| 5,478,887 | 12/1995 | Huynh-Ba | 525/146 |
| 5,583,174 | 12/1996 | Kohler et al. | 525/147 |
| 5,589,544 | 12/1996 | Horrion | 525/176 |

FOREIGN PATENT DOCUMENTS

| | | |
|---|---|---|
| 247 465 | 12/1987 | European Pat. Off. |
| 362 646 | 4/1990 | European Pat. Off. |
| 472 064 | 2/1992 | European Pat. Off. |
| 677 555 | 10/1995 | European Pat. Off. |
| 699 713 | 8/1996 | European Pat. Off. |
| 40 38 590 | 6/1992 | Germany |
| 57-125253 | 8/1982 | Japan |

OTHER PUBLICATIONS

Derwent Publication, JP-A-60 215 053 (Sumitomo Chem. Ind. KK) Oct. 28, 1985.

*Primary Examiner*—Randy Gulakowski
*Attorney, Agent, or Firm*—Connolly and Hutz

[57] ABSTRACT

Blends of
A) 80 to 99 wt. % of high molecular weight, thermoplastic, aromatic polycarbonate with a molecular weight $\bar{M}_w$ (weight average) of at least 10,000, which contains bifunctional carbonate structural units of the formula (I),

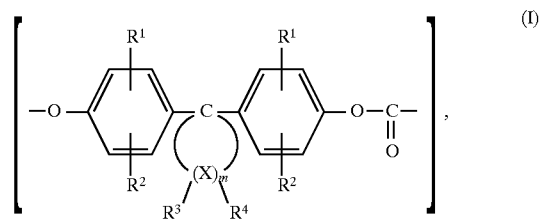

in which
$R^1$ and $R^2$ mutually independently mean hydrogen, halogen, $C_1$–$C_8$ alkyl, $C_5$–$C_6$ cycloalkyl, $C_6$–$C_{10}$ aryl, preferably phenyl, and $C_7$–$C_{12}$ aralkyl,
m means an integer from 4 to 7, preferably 4 or 5,
$R^3$ and $R^4$ individually selectably for each X, mutually independently mean hydrogen or $C_1$–$C_6$ alkyl and
X means carbon,
providing that on at least one atom X, $R^3$ and $R^4$ simultaneously mean alkyl,
B) 1 to 20 wt. % of a terpolymer prepared from 60 to 70 wt. % of ethylene, 37 to 20 wt. % of an acrylic acid ester of a $C_2$–$C_{12}$ alcohol and 3 to 10 wt. % of a monomer with epoxy groups.

6 Claims, No Drawings

BLENDS OF AROMATIC POLYCARBONATES AND EPOXY-FUNCTIONAL TERPOLYMERS

This invention relates to blends of specific dihydroxydiphenylcycloalkane polycarbonates and terpolymers of ethylene, acrylates and monomers with epoxy groups.

Didhydroxydiphenylcycloalkane polycarbonates which are suitable according to the invention are known and described in European patent 359 953. The polycarbonate based on 1,1-bis-(4-hydroxyphenyl)-3,3,5-trimethylcyclohexane and the copolycarbonate of this bisphenol with bisphenol A is particularly preferred.

These polycarbonates are distinguished by elevated heat resistance; however, there is still room for improvement in their stress cracking resistance and toughness.

The invention is based on the recognition that the stated polycarbonates may be blended with epoxy-functional terpolymers, wherein unexpectedly high stress cracking resistance and impact strength are achieved.

The present invention provides blends of

A) 80 to 99 wt. %, preferably 85 to 93 wt. % of high molecular weight, thermoplastic, aromatic polycarbonate with a molecular weight $\overline{M}_w$ (weight average) of at least 10,000, preferably of 20,000 to 300,000, which contains bifunctional carbonate structural units of the formula (I),

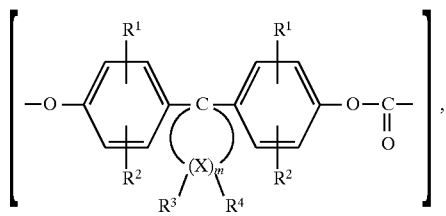

in which
R$^1$ and R$^2$ mutually independently mean hydrogen, halogen, preferably chlorine or bromine, C$_1$–C$_8$ alkyl, C$_5$–C$_6$ cycloalkyl, C$_6$–C$_{10}$ aryl, preferably phenyl, and C$_7$–C$_{12}$ aralkyl, preferably phenyl-C$_1$–C$_4$-alkyl, in particular benzyl,
m means an integer from 4 to 7, preferably 4 or 5,
R$^3$ and R$^4$ individually selectably for each X, mutually independently mean hydrogen or C$_1$–C$_6$ alkyl and X means carbon,
providing that on at least one atom X, R$^3$ and R$^4$ simultaneously mean alkyl, B) 1 to 20, preferably 7 to 15 wt. % of a terpolymer prepared from 60 to 70 wt. % of ethylene, 37 to 20 wt. % of an acrylic acid ester of a C$_2$–C$_{12}$ alcohol and 3 to 10 wt. % of a monomer with epoxy groups, preferably glycidyl methacrylate.

Polycarbonates A) and the production thereof are the subject matter of European Patent 359 953. The polycarbonates themselves and the production thereof are described exhaustively therein.

Starting products for the production of the polycarbonates A) are accordingly dihydroxydiphenylcycloalkanes of the formula (Ia)

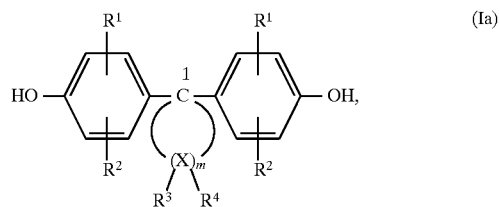

in which
X, R$^1$, R$^2$, R$^3$, R$^4$ and m have the meaning stated for formula (I).
On 1 to 2 X atoms, in particular on only one X atom, R$^3$ and R$^4$ are preferably simultaneously alkyl.

The preferred alkyl residue is methyl; the X atoms in α position relative to the diphenyl-substituted C atom (C-1) are preferably not dialkyl-substituted, whereas alkyl substitution in β position relative to C-1 is preferred.

Preferred dihydroxydiphenylcycloalkanes are those with 5 and 6 ring C atoms in the cycloaliphatic residue (m=4 or 5 in formula Ia), for example the diphenols of the formulae (Ib) to (Id),

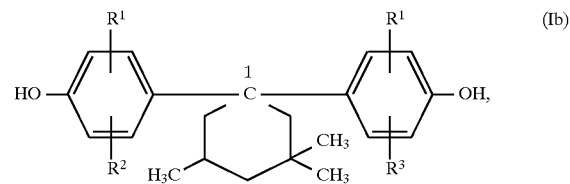

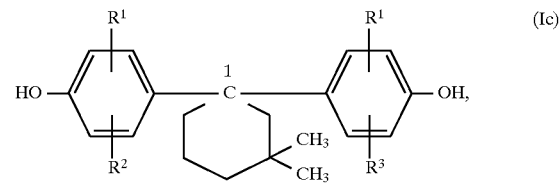

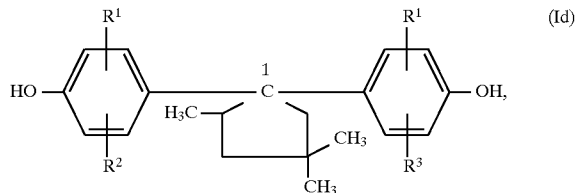

wherein 1,1-bis-(4-hydroxyphenyl)-3,3,5-trimethylcyclohexane (formula Ib with R$^1$ and R$^2$ being H) is particularly preferred.

It is possible to use both a single diphenol of the formula (Ia) to yield homopolycarbonates and two or more diphenols of the formula (Ia) to yield copolycarbonates.

The diphenols of the formula (Ia) may moreover also be used mixed with other diphenols, for example with those of the formula (Ie)

to produce high molecular weight, thermoplastic, aromatic polycarbonates.

Suitable other diphenols of the formula (Ie) are those in which Z is an aromatic residue with 6 to 30 C atoms, which may contain one or more aromatic rings, may be substituted and may contain aliphatic residues or cycloaliphatic residues other than those of the formula (Ia) or heteroatoms as bridging members.

Examples of preferred other diphenols are:
4,4'-dihydroxydiphenyl, 2,2-bis-(4-hydroxyphenyl) propane, 2,4-bis-(4-hydroxyphenyl)-2-methylbutane, 1,1-bis-(4-hydroxyphenyl)cyclohexane, α,α-bis-(4-hydroxyphenyl)-p-diisopropylbenzene, 2,2-bis-(3-methyl-4-hydroxyphenyl)-propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl)sulphone, 2,4-bis-(3,5-dimethyl-4-hydroxyphenyl)-2-methylbutane, 1,1-bis-(3,5-dimethyl-4-hydroxyphenyl)cyclohexane, α,α-bis-(3,5-dimethyl-4-hydroxyphenyl)-p-diisopropylbenzene, 2,2-bis-(3,5-dichloro-4-hydroxyphenyl)propane and 2,2-bis-(3,5-dibromo-4-hydroxyphenyl)-propane.

Examples of particularly preferred diphenols of the formula (Ie) are:

2,2-bis-(4-hydroxyphenyl)propane, 2,2-bis-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)-propane and 1,1-bis-(4-hydroxyphenyl)cyclohexane.

2,2-Bis-(4-hydroxyphenyl)propane is in particular preferred. The other diphenols may be used both individually and as a mixture.

The molar ratio of diphenols of the formula (Ia) to the other diphenols of the formula (Ie), which are optionally also to be used, ranges from 100 mol. % of (Ia):0 mol. % of (Ie) to 2 mol. % of (Ia):98 mol. % of (Ie), preferably from 100 mol. % of (Ia):0 mol. % of (Ie) to 5 mol. % of (Ia):95 mol. % of (Ie) and in particular from 100 mol. % of (Ia):0 mol. % of (Ie) to 10 mol. % of (Ia):90 mol. % of (Ie) and very particularly preferably from 100 mol. % of (Ia):0 mol. % of (Ie) to 20 mol. % of (Ia):80 mol. % of (Ie).

The high molecular weight polycarbonates made from the diphenols of the formula (Ia), optionally combined with other diphenols, may be produced using known polycarbonate production processes. The various diphenols may here be linked together both randomly and in blocks.

The polycarbonates may be branched in a manner known per se by incorporating small quantities, preferably quantities of between 0.05 and 2.0 mol. % (relative to the diphenols used) of trifunctional or greater than trifunctional compounds, in particular such compounds with three or more than three phenolic hydroxyl groups. Some branching agents with three or more than three phenolic hydroxyl groups are:

phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl) benzene, 1,1,1-tri-(4-hydroxyphenyl)ethane, tri-(4-hydroxyphenyl)-phenylmethane, 2,2-bis-[4,4-bis-(4-hydroxyphenyl)-cyclohexyl]propane, 2,4-bis-(4-hydroxyphenylisopropyl)-phenol, 2,6-bis-(2-hydroxy-5-methylbenzyl)-4-methylphenol, 2-(4-hydroxyphenyl)-2-(2,4-dihydroxyphenyl)propane, hexa-[4-(4-hydroxyphenylisopropyl)phenyl]-orthoterephthalic acid ester, tetra-(4-hydroxyphenyl) methane, tetra-[4-(4-hydroxyphenylisopropyl) phenoxy]methane and 1,4-bis-[4', 4''-dihydroxytriphenyl) methyl] benzene.

Some other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds act as chain terminators for the per se known regulation of the molecular weight of the polycarbonates A. Suitable compounds are, for example, phenol, tert.-butylphenols or other alkyl-$C_1$–$C_7$-substituted phenols. In particular, small quantities of phenols of the formula (If) are suitable for regulating molecular weight

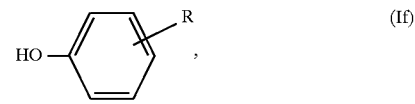

in which

R denotes a branched $C_8$ and/or $C_9$ alkyl residue.

The proportion of $CH_3$ protons in the alkyl residue R is preferably between 47 and 89% and the proportion of CH and $CH_2$ protons between 53 and 11%; R is also preferably in o- and/or p-position relative to the OH group and the upper limit of the ortho proportion is particularly preferably 20%. The chain terminators are generally used in quantities of 0.5 to 10, preferably of 1.5 to 8 mol. %, relative to the diphenols used.

The polycarbonates A may preferably be produced in a manner know per se using the phase interface process (c.f. H. Schnell, *Chemistry & Physics of Polycarbonates, Polymer Reviews*, volume IX, page 33 et seq., Interscience Publ. 1964).

In this process, the diphenols of the formula (Ia) are dissolved in an aqueous alkaline phase. In order to produce copolycarbonates with other diphenols, mixtures of diphenols of the formula (Ia) and the other diphenols, for example those of the formula (Ie), are used. Chain terminators, for example of the formula (If), may be used to regulate molecular weight. The mixture is then reacted in the presence of an inert organic phase, which preferably dissolves polycarbonate, with phosgene using the phase interface condensation method. The reaction temperature is between 0° C. and 40° C.

The optionally also used branching agents (preferably 0.05 to 2.0 mol. %) may either initially be introduced with the diphenols in the aqueous alkaline phase or added before phosgenation dissolved in an organic solvent. In addition to the diphenols of the formula (Ia) and optionally other diphenols (Ie), the mono- and/or bischlorocarbonates thereof may also be used, wherein these are added dissolved in organic solvents. The quantity of chain terminators and of branching agents is then determined by the molar quantity of diphenolate residues of the formula (Ia) and optionally of formula (Ie); if chlorocarbonates are also used, the quantity of phosgene may be reduced accordingly in a known manner.

Suitable organic solvents for the chain terminators and optionally for the branching agents and the chlorocarbonates are, for example, methylene chloride, chlorobenzene, acetone, acetonitrile together with mixtures of these solvents, in particular mixtures of methylene chloride and chlorobenzene. The chain terminators and branching agents used may optionally be dissolved in the same solvent.

The organic phase used for the phase interface polycondensation is, for example, methylene chloride, chlorobenzene as well as mixtures of methylene chloride and chlorobenzene.

The aqueous alkaline phase used is, for example, NaOH solution. Production of the polycarbonates A using the phase interface process may be catalysed in a conventional manner by catalysts such as tertiary amines, in particular tertiary aliphatic amines such as tributylamine or triethylamine; the catalysts may be used in quantities of 0.05 to 10 mol. % relative to the molar quantity of diphenols used. The catalysts may be added before the beginning of phosgenation or during or also after phosgenation.

The polycarbonates A may be produced using the known homogeneous phase process, the so-called "pyridine process", as well as by the known melt transesterification process, for example using diphenyl carbonate instead of phosgene.

The polycarbonates A preferably have molecular weights $\overline{M}_w$ (weight average, determined by gel chromatography after prior calibration) of at least 10,000, particularly preferably of 20,000 to 300,000 and in particular of 20,000 to 80,000.

The particularly preferred polycarbonates A are thus those prepared from units of the formula (Ig)

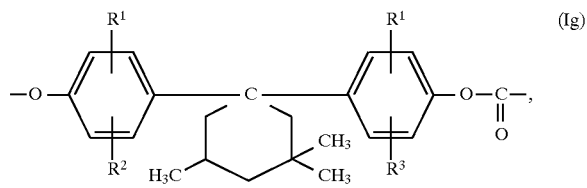

in which $R^1$ and $R^2$ have the meaning stated for formula (I), but are particularly preferably hydrogen.

Moreover, by means of any desired combination with other diphenols, in particular with those of the formula (Ie), the properties of the polycarbonate may be favourably varied. In such copolycarbonates, the polycarbonates contain the diphenols of the formula (Ia) in quantities of 100 mol. % to 2 mol. %, preferably in quantities of 100 mol. % to 5 mol. % and in particular in quantities of 100 mol. % to 10 mol. % and very particularly of 100 mol. % to 20 mol. %, relative to the total quantity of 100 mol. % of diphenol units.

The blends may be produced by melt compounding of the components in kneaders or extruders at 220° C. to 380° C. or by co-dissolving the components in suitable solvents, such as for example chlorobenzene and/or methylene chloride, and evaporation in a vented extruder.

The terpolymers B) are produced by copolymerising ethylene, $C_2$–$C_{12}$ alkyl acrylates and epoxy-functional monomers, preferably glycidyl methacrylate.

Terpolymers of ethylene, butyl or 2-ethylhexyl acrylate and glycidyl methacrylate are particularly preferred.

The blends according to the invention may be processed into mouldings or semi-finished products by injection moulding or extrusion. The mouldings are used, for example, as reflectors for lamps, casings for technical appliances and in automotive engineering (underbonnet applications in the vicinity of the engine).

The blends are distinguished by very good stress cracking behaviour and good toughness (ductile failure at room temperature) combined with elevated heat resistance.

EXAMPLES

Example 1

1800 g of a copolycarbonate prepared from 65 mol. % of bisphenol A and 35 mol. % of 1,1-bishydroxyphenyl-3,3,5-trimethylcyclohexane with a relative solution viscosity of 1.29 (0.5% at 25° C. in methylene chloride) and 200 g of a terpolymer prepared from ethylene, butyl acrylate and glycidyl methacrylate (Lotader AX 8660 from Norsolor) are melt blended in a ZSK 32 twin screw extruder.

A material is obtained which exhibits ductile failure in 100% of cases on notched impact testing (43.4 kJ/m² notched impact strength).

A bar stressed to 2% outer fibre strain still exhibits ductile failure on flexural impact testing after 2 minutes' exposure to a 1:1 toluene/isooctane mixture (the copolycarbonate alone breaks even without pre-stressing).

Example 2

1900 g of the copolycarbonate is blended with 100 g of the terpolymer. A blend is obtained which exhibits brittle failure in 20% of cases on notched impact testing.

Comparison 1

1800 g of the copolycarbonate is blended with 200 g of a terpolymer prepared from ethylene, butyl acrylate and maleic anhydride (Lotader 5500 from Norsolor). A blend is obtained which exhibits ductile failure in 0% of cases.

What is claimed is:

1. Blends of
A) 80 to 99 wt. % of high molecular weight, thermoplastic, aromatic polycarbonate with a molecular weight $\overline{M}_w$ (weight average) of at least 10,000, which contains bifunctional carbonate structural units of the formula (I),

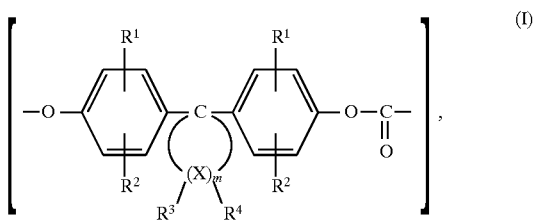

in which
$R^1$ and $R^2$ mutually independently mean hydrogen, halogen, $C_1$–$C_8$ alkyl, $C_5$–$C_6$ cycloalkyl, $C_6$–$C_{10}$ aryl and $C_7$–$C_{12}$ aralkyl,
m means an integer from 4 to 7,
$R^3$ and $R^4$ individually selectably for each X, mutually independently mean hydrogen or $C_1$–$C_6$ alkyl and
X means carbon,
providing that on at least one atom X, $R^3$ and $R^4$ simultaneously mean alkyl,
B) 1 to 20 wt. % of a terpolymer prepared from 60 to 70 wt. % of ethylene, 37 to 20 wt. % of an acrylic acid ester of a $C_2$–$C_{12}$ alcohol and 3 to 10 wt. % of epoxy-functional monomers.

2. The blend of claim 1, wherein the aromatic polycarbonate A) has a weight average molecular weight of 20,000 to 300,000.

3. The blend of claim 1, wherein the epoxy-functional monomer in the terpolymer B) is glycidyl methacrylate.

4. The blend of claim 1, wherein the terpolymer B) is a terpolymer of ethylene, butyl acrylate and glycidyl methacrylate.

5. The blend of claim 1, containing 90% by weight of A) and 10% by weight of B).

6. The blend of claim 1, containing 95% by weight of A) and 5% by weight of B).

* * * * *